Patented May 22, 1945

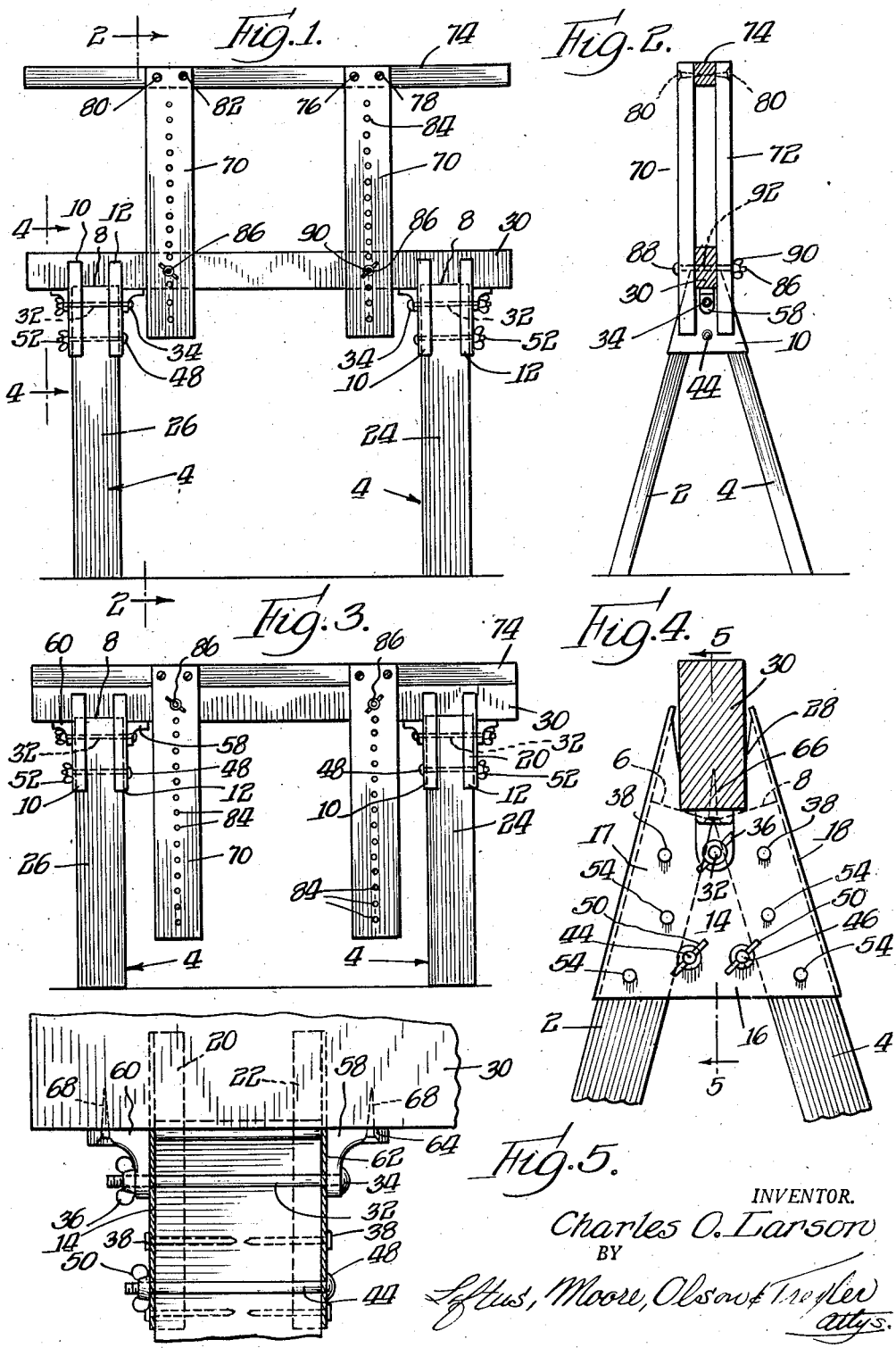

2,376,787

UNITED STATES PATENT OFFICE 2,376,787

SAWHORSE

Charles O. Larson, Sterling, Ill., assignor to Chas. O. Larson Co., Sterling, Ill., a corporation of Illinois Application July 12, 1944, Serial No. 544,571

4 Claims. (Cl. 304—6)

This invention relates to sawhorses formed of a number of separate hardware pieces including brackets, bolts, wing nuts, screws, nails and corner braces adapted to be applied to precut wood of a length such as two by fours, whereby the hardware when applied to the wooden members will form a detachable sawhorse.

It is an object of the invention to provide, in combination with the foregoing, additional members adapted to form an extensible or adjustable support for the sawhorse so as to provide an adjustably higher sawhorse, upon two of which may be placed a wooden platform so as to facilitate painting, cleaning wallpaper, and many other household needs.

Yet another object of the invention is to provide a sawhorse adjustable as to size.

Yet another object of the invention is to provide a very rigid, strong, durable, knockdown sawhorse.

Other and further objects of the invention will be apparent from a perusal of the following specification, when taken in connection with the accompanying drawing, wherein:

Figure 1 is a side perspective view of one form of the adjustable sawhorse;

Figure 2 is an end view taken on line 2—2 thereof;

Figure 3 is a view showing the assembly of Figure 1 with the adjustable sawhorse collapsed;

Figure 4 is an end view on the line 4—4 of Figure 1; and

Figure 5 is a view taken on the line 5—5 of Figure 4.

Referring now to the drawing in detail, the invention comprises the provision of four identical lengths of two by four, or any other suitable thickness of sawed lumber, to provide two pairs of upstanding legs arranged in the form of a V. These legs 2 and and 4 are shown in two pairs in Figures 1 and 2. The upper portions or upper edges of these legs 2 and 4 are shown at 6 and 8, and each pair is suitably arranged in inverted V-shaped formation, as shown in Figures 2 and 4, and is held in such position by two sheet metal brackets 10 and 12. Each of these brackets, as shown in Figures 3 and 4, comprises a side plate 14 generally pyramidal in outline, being provided with a lower edge 16 and two upwardly and inwardly converging side edges 17 and 18 forming two flanges 20 and 22, see Figure 5. These flanges 20 and 22 overlie the broader face 24 and 26 of the legs. In addition, each bracket member is provided on its upper surface with a rectangular-like recessed portion 28 which opens upwardly to receive a cross board or top support 30. In addition, each bracket is provided with an opening through which passes a bolt 32 having on one end a head 34 and adapted threadedly to receive on the opposite end a wing nut 36. Just opposite the bolt hole through which the bolt 32 passes, each bracket is provided with nail holes through which nails 38 pass. In addition there are provided two other openings just inside of the position which the legs 2 and 4 occupy, and these are adapted to receive bolts 44 and 46 having heads 48 and wing nuts 50. In addition, there are preferably screw or nail holes which are adapted to receive, through each bracket into the leg members 2 and 4, nails or screws 54 so that with the assistance of the three bolts 32, 44 and 46 which clamp the two bracket members together the legs are securely held in position. In addition to the bolts there are two corner bracket members 58 and 60 which, as shown in Figure 5, have faces 62 and 64 lying at right angles and being provided with openings for receiving the bolt 32 and the screws 68, which screws 68 pass into the underside of the top cross piece 30. Thus the bolts and the screws and the nails securely hold the leg members in inverted V-shaped form to the cross top member 30, forming a very rigid, firm connection therewith.

If desired, an extension sawhorse is provided by two pairs of two by fours 70 and 72 which at the top receive therebetween the upper cross member 74, the junction being secured by two pairs of screws 76 and 78, 80 and 82. Each leg 70 is provided with a series of vertically spaced holes 84 which are adapted to receive the bolt 86 having a head 88 and a wing nut 90. These bolts 86 are adapted to pass through openings 92 formed in the top member 30 so that when the desired hole 84 is selected and the bolt 86 passed therethrough and through the holes in the top member 30, the upper cross rest or support 74 will be held in parallelism to the support 30 and at an adjusted height thereabove.

Figure 3 shows this member in collapsed position with bolts passing through the uppermost holes in the legs 70 so as to maintain the cross bars 30 and 74 in collapsed position. Thus by using one corner brace on each side, running a bolt through and fastening the wing nut and the long screws into the cross members, a very rigid sawhorse is provided, and when the extension member is provided therefor, a platform may be placed across a pair of these sawhorse extensions so as to give any desired adjustable height for painting, cleaning wallpaper, and other household need.

It will thus be seen that there has been provided an adjustable sawhorse which is composed of a minimum number of hardware pieces, including the corner brackets, the end brackets which may be of sheet metal or cast metal if desired, including bolts, wing nuts, screws and nails, which may be sold either independently of the two by fours dimension of lumber cut to proper size, to provide two saw horses and two adjustable extensions therefor to provide a foundation for a cross platform for any desired type of work.

Obviously the invention is not limited to the specific details of construction disclosed herein but is capable of other modifications and changes without departing from the spirit and scope of the appended claims.

Having thus described the invention, what is new and desired to be secured by Letters Patent is:

1. A sawhorse comprising two identical wooden legs disposed in inverted V-shaped formation, a cross support, two pairs of metal brackets of generally inverted, truncated, pyramidal form, each having a flat end plate and a pair of converging flanges, and at its narrow portion, a rectilinear opening for the reception of the cross member, a pair of corner brackets having surfaces disposed at right angles, one surface to engage the underside of the cross member and the other surface to engage the side plate directly under the cross member, said transversely disposed faces having perforations, fastening members passing through one to engage the underside of the cross member, and a bolt passing through the registering holes of the other two corner members and through registering openings in the pair of substantially pyramidal bracket members, and a wing nut to hold the two corner braces and two side plates in position, and additional carriage bolts clamping the two side plates in position between said legs whereby to hold the pairs of legs in inverted V-shaped formation, said cross support being mounted in the rectilinear cut out portions of the upper portions of the two side plates.

2. A sawhorse comprising two identical wooden legs disposed in inverted V-shaped formation, a cross support, two pairs of metal brackets of generally inverted, truncated, pyramidal form, each having a flat end plate and a pair of converging flanges, each said side plate at its narrow portion having a rectilinear opening for the reception of the cross member, a pair of corner brackets having surfaces disposed at right angles, one surface to engage the underside of the cross member and the other surface to engage the side plate directly under the cross member, said transversely disposed faces having perforations, fastening members passing through one to engage the underside of the cross member, and a bolt passing through the registering holes of the other two corner members and through registering openings in the side plates of the pair of substantially pyramidal bracket members, and a wing nut to hold the two corner braces and two side plates in position, and additional carriage bolts clamping the two side plates in position whereby to hold the pairs of legs in inverted V-shaped formation, said cross member being mounted in the rectilinear cut out portions of the upper portions of the two side plates, said cross member having a pair of spaced openings in its side between the two pairs of inverted V-shaped legs and an extension comprising two pairs of legs disposed in parallelism, means rigidly interconnecting the upper portions of said pairs of legs in spaced relation, said legs having vertically spaced registering openings, and a bolt passing through a pair of said registering openings and one of the openings in the first mentioned cross support whereby to hold said extension top in parallelism to the bottom cross member at any desired height depending upon which spaced opening in the parallel legs is selected to receive the bolt.

3. A sawhorse comprising two pairs of wooden legs identical in length and disposed in inverted V-shaped formation, two pairs of identical clamping plates each having relatively flat plates each formed with a broad base, two converging sides and a top portion having a rectilinear cut out therein, the converging sides of each plate having lateral flanges, said brackets being placed upon said two pairs of inverted V-shaped legs with the flanges thereof overlying the edges of the legs, and a cross member lying in the cut out portions of the upper portions of the bracket, rigid right angled corner pieces having one side perforated and juxtaposed to the underside of the cross piece and the other side being perforated and juxtaposed to each plate of the brackets on opposite sides of the plates, and fastening bolts passing through two of the side plates of the brackets and through registering holes in two of the corner braces to hold the clamping plates, brackets and legs rigidly together, and means also rigidly passing through the holes of and interconnecting the corner pieces with the top cross members.

4. In combination with a top cross bar of a sawhorse, said cross bar having two spaced holes passing horizontally to the sides of the same intermediate the legs of the sawhorse, a trestle comprising two pairs of legs, a second top bar, each pair of legs comprising a pair of parallel spaced apart members connected at their tops to the side portions of the trestle tops, the parallel members of each pair of legs having a vertical series of spaced holes passing horizontally therethrough in registration, said legs straddling the top cross bar of the sawhorse, an elongated bolt passing through the registering holes in the parallel members and through the holes in the top cross bar of the sawhorse, and means engaging the bolt for clamping the pairs of members of the pairs of legs in position in the holes of the top cross bar of the sawhorse to maintain the trestle top bar in elevated position above the top bar of the sawhorse, or alternately whereby on removal of the bolts said top trestle bar will lie flat against the top side of the top cross bar of the sawhorse with the legs depending downwardly between the legs of the sawhorse.

CHARLES O. LARSON.